United States Patent
Mahindru et al.

(10) Patent No.: US 11,874,730 B2
(45) Date of Patent: Jan. 16, 2024

(54) IDENTIFYING LOG ANOMALY RESOLUTION FROM ANOMALOUS SYSTEM LOGS

(71) Applicant: International Business Machines Corporation, Armonk, NY (US)

(72) Inventors: Ruchi Mahindru, Elmsford, NY (US); Harshit Kumar, Delhi (IN); Sahil Bansal, Kurukshetra (IN); Anbang Xu, San Jose, CA (US); Lu An, Raleigh, NC (US); Gargi B. Dasgupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/681,774

(22) Filed: Feb. 26, 2022

(65) Prior Publication Data
US 2023/0273849 A1 Aug. 31, 2023

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0778* (2013.01); *G06F 11/0793* (2013.01)

(58) Field of Classification Search
CPC ............... G06F 11/079; G06F 11/0751; G06F 11/0778; G06F 11/0793
USPC ....................................... 714/1–57
See application file for complete search history.

(56) References Cited

U.S. PATENT DOCUMENTS

| 10,474,519 | B2 | 11/2019 | Talwadker | |
|---|---|---|---|---|
| 2008/0141077 | A1* | 6/2008 | Swanson | G06F 11/008 714/48 |
| 2010/0121520 | A1* | 5/2010 | Yukawa | G06F 11/0793 701/31.4 |
| 2014/0380105 | A1* | 12/2014 | Michel | G06F 11/0709 714/57 |
| 2017/0017881 | A1* | 1/2017 | Langley | B64F 5/00 |

(Continued)

FOREIGN PATENT DOCUMENTS

| AU | 2015203088 B2 | 6/2016 |
|---|---|---|
| CN | 109213842 A | 1/2019 |

(Continued)

OTHER PUBLICATIONS

Ahad, et al., "Toward Autonomic Cloud: Automatic Anomaly Detection and Resolution", Published in: 2015 International Conference on Cloud and Autonomic Computing, Date of Conference: 21-25 Sep. 2015, Date Added to IEEE Xplore: Oct. 29, 2015.

(Continued)

*Primary Examiner* — Sarai E Butler
(74) *Attorney, Agent, or Firm* — David K Mattheis

(57) ABSTRACT

Identifying an log anomaly resolution by generating a knowledge base linking each of a plurality of incidents with historical anomalous log lines, calculating a resolution specificity score for each knowledge base record, identifying a run-time anomalous log line using the knowledge base, predicting a category for the run-time anomalous log line, identifying resolutions according to the category, ranking the resolutions according to the resolution specificity scores, and recommending a resolution according to the ranking.

20 Claims, 4 Drawing Sheets

(56) References Cited

U.S. PATENT DOCUMENTS

2019/0065343 A1\* 2/2019 Li .................. G06F 11/3608
2019/0325323 A1 10/2019 Walthers
2020/0293946 A1 9/2020 Sachan

FOREIGN PATENT DOCUMENTS

| CN | 113326244 A | 8/2021 |
|----|---|---|
| IN | 201621018164 A | 5/2016 |
| IN | 202111040536 A | 9/2021 |
| JP | 2018518762 A | 7/2018 |
| JP | 69194382 A | 3/2019 |

OTHER PUBLICATIONS

"Orbit Intelligence", Copyright © Questel 2022, all rights reserved, 2 pps., <https://www.orbit.com/?locale=en&ticket=e3105b4b-ca9e-4269-951e-b12039469a22&embedded-false#PatentDocumentPage>.

Mahindru et al., "Log Anomaly to Resolution: AI Based Proactive Incident Remediation", 5 pps., downloaded from the Internet on Feb. 13, 2022.

Mell et al., "The NIST Definition of Cloud Computing", National Institute of Standards and Technology, U.S. Department of Commerce, NIST Special Publication 800-145, Sep. 2011, 7 pages.

Williams, "Understanding Playbooks and the Relationship of Runbooks, Knowledge Base Articles and Workflows," Article, ServiceNow, 2018, 1 pp., <https://community.servicenow.com/community?d=community_article&sys_id=500c712adbeb2f80107d5583ca9619ce>.

\* cited by examiner

IDENTIFYING LOG ANOMALY RESOLUTION FROM ANOMALOUS SYSTEM LOGS

FIELD OF THE INVENTION

The disclosure relates generally to the machine learning-based identification of log anomaly resolutions. The disclosure relates particularly to machine learning-based identification of log anomaly resolutions from anomalous system log entries.

BACKGROUND

In an information technology system environment, there are numerous sources of data associated with system incidents, system logs, performance metrics, alerts, etc. Such sources have the potential to provide predictions of system incidents. The sources may include huge volumes of data including both data associated with incidents as well as data unrelated to incidents.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the automatic identification and execution of log anomaly resolutions according to anomalous run-time system log lines.

Aspects of the invention disclose methods, systems and computer readable media associated with identifying a resolution by generating a knowledge base linking each of a plurality of historical tickets with historical anomalous log lines, calculating a resolution specificity score for each record in the knowledge base, identifying a run-time anomalous log line using the knowledge base, predicting contextual cues, such as category, sub-category, message code, etc., for the run-time anomalous log line, identifying resolutions according to the contextual cues, ranking the resolutions according to the resolution specificity scores, and recommending a resolution according to the ranking.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
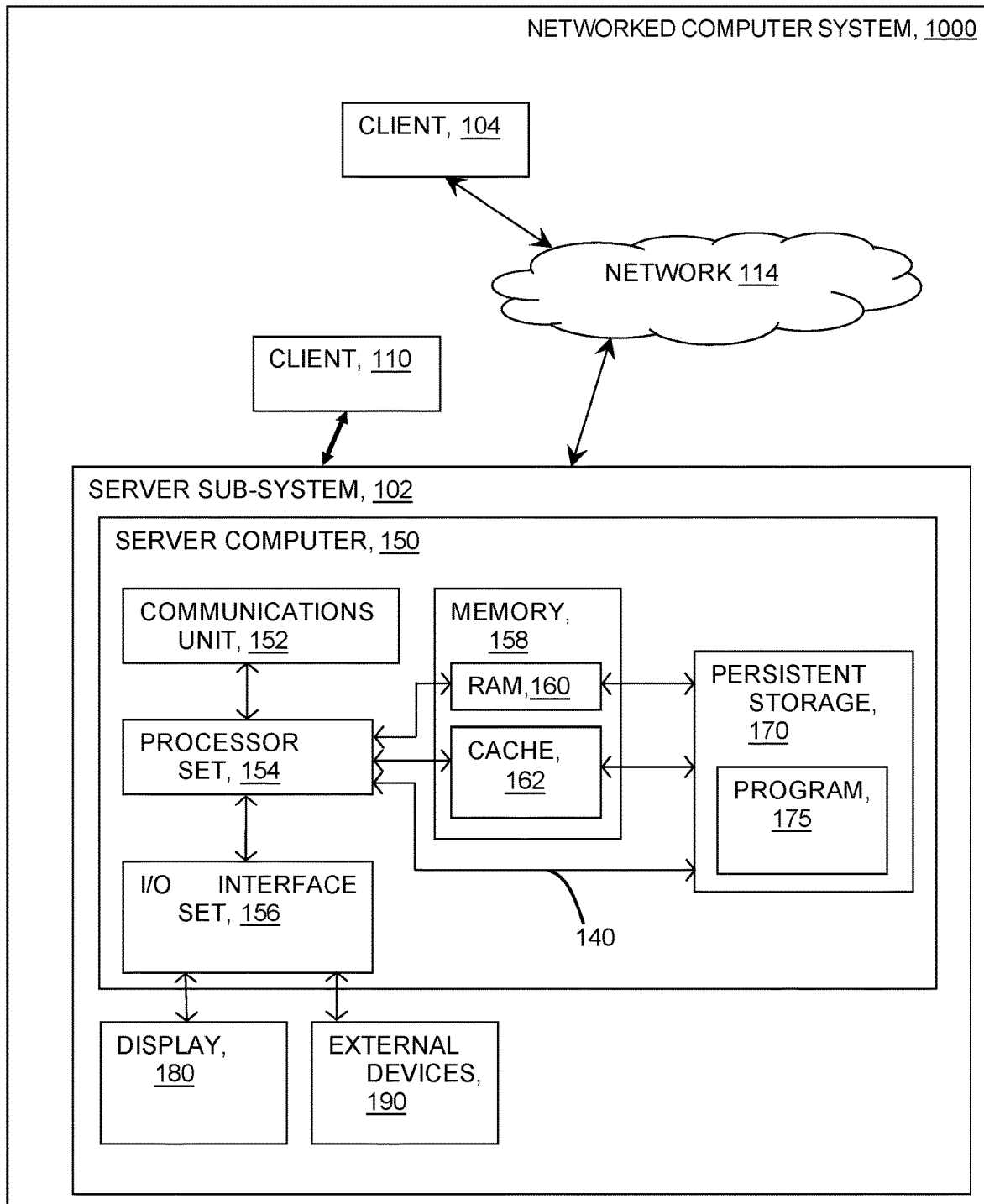
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an information technology environment, system related signals arise from system logs, performance metric data, alert data and other source relating ingoing system data. Dozens of signals may be related to system operations at any particular moment, and potentially related to a system incident associated with system hardware and software components. System logs may hold the key information indicating a future system incident. The challenge relates to the sheer volume of system signal data which may include the predictive signals associated with the incident and from which a warning related to such an incident may be gleaned—provided that the volume of signals may be efficiently processed in a timely manner to provide a useful and timely warning regarding such incidents. Disclosed embodiments provide systems and methods to identify anomalous system log lines, map such anomalous log lines to potential resolutions, rank and recommend such resolutions, as well as learning and fine tuning the system and methods using ongoing feedback.

Aspects of the present invention relate generally to system log analysis systems and methods for the purposes of recommending and implementing log anomaly resolutions. In embodiments, at run-time, a resolution recommendation system receives system log lines, analyzes these log lines using a developed model to identify anomalous log line, predicts problem categories and problem sub-categories for the anomalous log lines, identifies potential resolutions to the predicted problem categories and subcategories, ranks the potential resolutions and provides and/or implements the recommended resolutions. According to aspects of the invention, a build time, the system analyzes historical incident data to identify anomalous log lines relevant to past system incidents, curate a problem category ontology based upon the historic incident categories, associate each historic incident with identified anomalous log lines for use in predicting categories at run-time as well as to map predicted anomalous log line to historic incidents and associated historic resolutions, and determine resolution specificity scores for historic resolutions.

In accordance with aspects of the invention there is a method for automatically identifying anomalous system log lines, extract message code from the identified anomalous log lines, predicting problem categories associated with the identified anomalous log lines and message code, and calculating a confidence score for the prediction. The method further maps predicted problem categories and sub-categories to historic log anomaly resolutions, ranks the potential resolutions according to category and sub-category data, and provides/implements the top-ranked resolution. In support of these actions, the method extracts data associated with historic system incidents and contemporaneous system log lines. The method identifies anomalous log lines and associates them with the historic incidents. The method extracts message code from each of the historic incidents and the historic log lines to identify matching incident and log line message codes. The method utilizes such matching message code to boost confidence scores associated with problem category and sub-categories associated with the incidents and anomalous log lines. The method trains a predictive model using the labeled data associated with the historic incidents and anomalous log lines. This predictive model provides category and sub-category predictions for run-time anomalous log lines which the method uses in mapping potential log anomaly resolutions for the run-time anomalous log lines.

Aspects of the invention provide an improvement in the technical field of recommending and implementing resolutions to identified log anomalies. In many cases, users do not have a process to identify which log line(s) among hundreds or thousands of contemporaneous log lines are actually associated with an incident, or which log lines among thousands of run-time log lines are anomalous and indicative of looming system incidents, or an appropriate resolution to implement for such a looming system incident. As a result, proposed resolutions may relate only tangentially, if at all, to currently approaching system incidents. In some case implementation of a resolution may be counterproductive as the implemented resolution is unrelated to current anomalies. Implementations of the invention leverage subject matter expert knowledge and historic incident and log data to train a model to identify anomalous log lines from amongst large volumes of run-time data, to then map the anomalous log lines to potential resolutions, to rank the potential resolutions and then recommend and implement the top-ranked resolution to the current log anomaly.

Aspects of the invention also provide an improvement to computer functionality. In particular, implementations of the invention are directed to a specific improvement to the way log anomaly resolution systems operate, embodied in the continually adjusted model that predicts problem categories and sub-categories which are mapped to potential resolutions. In embodiments, the system adjusts the predictive model each time a run-time log anomaly is resolved, such that the predictive model that is applied to the future log line data differs from the predictive model that is applied to the current log line data. As a result of adjusting the predictive model for the future log line data according to the category and sub-category predictions and mapped resolutions for the current log line data, the system increases the likelihood that the system will provide a beneficial resolution in response to run-time anomalous log line data. In this manner, embodiments of the invention affect how the log anomaly resolution system operates through ongoing modification of the predictive model according to log anomaly resolution feedback.

In an embodiment, one or more components of the system can employ hardware and/or software to solve problems that are highly technical in nature (e.g., generating a knowledge base linking each of a plurality of historical incidents with historical anomalous log lines, calculating a resolution specificity score for each record in the knowledge base, identifying anomalous run-time log lines using the knowledge base, predicting incident categories for the identified run-time anomalous log lines, identifying log anomaly resolutions according to the predicted category, ranking the resolutions according to the respective resolution specificity score, recommending resolutions according to the ranking etc.). These solutions are not abstract and cannot be performed as a set of mental acts by a human due to the processing capabilities needed to facilitate log anomaly resolution, for example. Further, some of the processes performed may be performed by a specialized computer for carrying out defined tasks related to log anomaly identification and resolution. For example, a specialized computer can be employed to carry out tasks related to identifying log anomalies through anomalous run-time log lines and recommending/implementing resolutions to the log anomalies or the like.

In an embodiment, an end-to-end system and method recommends system log anomaly, or anomalous log line, resolutions based upon run-time anomalous log line data. Run-time activities utilize a predictive model developed at build-time. The predictive model enables the identification of run-time anomalous log lines, the prediction of problem categories and sub-categories based upon the identified anomalous log lines, and the mapping of the identified anomalous log lines to potential log anomaly resolutions. Prediction confidence scores associated with the categories and sub-categories may be used to filter mapping results. Potential resolutions may be ranked using resolution specificity scores to identify a top-ranked resolution for recommendation and implementation by the system. In this embodiment, the method uses labeled feedback from successful log anomaly resolution to improve the predictive model enabling more accurate future category and sub-category predictions as well as more useful resolution recommendations.

In an embodiment, the system and method require a dataset which can associate incident—resolution pairings with log line data. Run-time system log line data may include millions of log lines, many of which are normal and not indicative of an abnormal system incident.

In this embodiment, at build time, the method augments a historic incident database with relevant labeled anomalous log lines. For each historic incident in the database, the method extracts data including the reporting time of the incident, the category and sub-category of the incidents, and the resolution of the incident. The method also extracts log lines from customer support interactions associated with each incident, such as data from an incident ticket including incident subject and description data. The method further analyzes log line data contemporaneous with each incident, log line data occurring withing a +/− window of time around the incident reporting time. This collection of log lines may include thousands or more, of log lines.

In an embodiment, the method evaluates the contemporaneous log lines to identify out-of-control-band log line anomalies—log line data indicating system performance outside of defined control limit boundaries, for example. In an embodiment, the method evaluates historic log line data known to free of anomalous log lines—clean log line data. The method extracts log line templates according to data patterns in the clean log line data, performs clustering, such as k-means clustering on the respective portions of the extracted templates, resulting in healthy log template clusters associated with healthy log line data.

In an embodiment, the method further evaluates historic log line data which may include log data associated with system incidents. In this embodiment, the method passes the log data to a dictionary-based error classifier which categorizes the data as either an erroneous or non-erroneous anomalous log line. Each of the categories of log lines are then evaluated and templates are extracted, clustered and the clustered templates are evaluated in terms of their frequency of occurrence for erroneous log lines and frequency of occurrence as well as satisfying a time stamp threshold indicating the log line resides within a time window defined around a known system incident. The results include anomalous error log template clusters as well as anomalous non-erroneous log template clusters. The method uses the combination of log templates, anomalous error log templates and anomalous non-erroneous log template clusters in training a predictive classifier model, such as a neural network, to correctly identify training data as healthy, or anomalous, and the anomalous data as either erroneous or non-erroneous. The trained machine learning predictive classifier may then be used to evaluate and classify run-time data.

In an embodiment, the method trains three distinct Machine Learning (ML) classifier model types, such as stochastic gradient descent (SGD) models, to receive log line input and output predicted category, sub-category, or sub-sub-category classifications. In an independent embodiment, the method trains a plurality of ML models, one for predicting the category and the second for predicting the sub-category, and so on. The first model receives training data including log line data labeled according to the category. This model trains to predict the category. The second model receives log line data labeled according to sub-category. This second model trains to predict the sub-category. This pattern continues through the plurality of models, using labeled historic hierarchical log line data.

In an embodiment, the method augments category and sub-category knowledge and labels using data extracted from product documentation and matched to incidents and log line data according to message code and confidence scores. In this embodiment, the method adds message string, message explanations, actions, URLs, and resolution data to the category and sub-category definitions.

In a conditional embodiment, the method trains the second SGD model as dependent upon the first SGD model. The method trains the first model to predict a category using log line data labeled according to category. The method trains the second model to predict the sub-category using log line data labeled according to predicted category from the first model as well as the sub-category.

In a hierarchical embodiment, the method trains n SGD models. One SGD model predicts the log line category, the remaining n-1 models predict the sub-category, with each of the remaining n-1 models associated with predicting a single sub-category. In this embodiment, the method trains the first model to predict a category for run-time log line data using log line data labeled according to category. For each predicted category, the method trains a model for each sub-category associated with that category using log line data labeled according to the category and each associated sub-category.

In an embodiment, the method uses the predicted results to map anomalous log lines and predicted categories and sub-categories to historic solutions for the matched incidents. In this embodiment, the method forms a mapping database, or an ontology, relating identified log lines to the predicted categories and sub-categories for historical incidents, as well as the resolutions associated with those incidents. The method submits queries to the ontology to extract results mapping the query items to incidents/resolutions.

In an embodiment, the method uses the trained model to classify run-time log lines as anomalous, non-erroneous indicators of system incidents, such identified anomalous log lines are added to the data associated with the particular incident. The method compares message codes extracted from the anomalous log lines and the customer support interactions. In an embodiment, the method boosts confidence scores for the anomalous log lines and category and sub-category matches for log line—customer support message codes which match.

In an embodiment, the method computes a resolution specificity score for the resolution associated with each incident. Each record in the augmented dataset consists of an anomalous log line, message code, incident description, category, sub-category, resolution, asset URL. An asset URL is a Subject Matter Expert (SME) identified resolution that is known to contain information about the resolution related to the symptom reported/detected. Several different asset URLs may be associated with the same combination of message code, category, and sub-category. Based on the frequency distribution of asset URLs for each combination of message code, category, and subcategory, the method calculates and adds two additional fields url_specificity_score, tuple_specificity_score for each record. The field url_specificity_score is defined to capture the confidence on the asset URL for each incident. The field tuple_specificity_score is defined to capture the confidence of the tuple for each incident. In an embodiment, the tuple comprises the message code, predicted category, and predicted sub-category for each record. For tuple set $tuple_1$, $tuple_2$, . . . $tuple_m$, and URL set $url_1$, $url_2$, . . . $url_n$, $c_{ij}$ represents the frequency of $url_i$ in $tuple_j$. The tuple specificity score$=c_{ij}/\Sigma_i c_i$. The URL specificity score $$= \frac{c_{ij}}{\sum_j c_j} * \log \frac{m}{|\{\text{tuple} \in \text{TUPLE}: url \in URL\}|}.$$

In an embodiment, at run-time, the method receives run-time log lines from the system. The method identifies anomalous log line data using the classification models described above. The method uses the previously trained classification model to predict incident category and sub-categories for the log line data. In this embodiment, the method extracts message code, key terms, symptom descriptions, etc., from the log lines. The method ignores customer or run-time specific content including paths, filenames, IP (internet protocol) addresses etc. The method submits the log line data extracted from the identified anomalous log lines to the predictive model. The method submits log line data and receives message code, message title, action, category, sub-category, asset title and asset links associated with the historical log anomaly resolutions associated or matched to the inputs data. The method submits a query to the mapping database or ontology, the query includes category and sub-category predictions as well as the log line data such as message code.

In an embodiment, the log line data does not contain message code data. In this embodiment, the method submits a query including the predicted category, subcategory, and a version of the log line masking the log line parameter values. In any embodiment, the method uses only those category and sub-category predictions having a model confidence score exceeding a defined threshold, such as 50%, in formulating the query for the mapping database.

In an embodiment, the method returns the top k records, where each record includes specificity scores satisfying a defined threshold., such as 50%. one or more records from the ontology in response to the submitted query. Each returned record includes an asset uniform resource locator (URL), log anomaly resolution information, URL specificity score, and a tuple specificity score. In an embodiment, the mapping model returns a single recommended resolution from the ontology for the predicted category and sub-category combination which is subsequently provided as an output to a user, such as a system administrator or site reliability engineer. In an embodiment, the mapping model yields more than a single category or sub-category prediction from the ontology. In this embodiment, the method ranks, or re-ranks the multiple resolutions of the output using the category and sub-category frequency across the set of resolutions, the URL specificity score and/or the tuple specificity score to adjust the order of the output resolutions. In an embodiment, the method ranks the potential resolutions according to the presence of features most widely used, such as asset version number and release date. In an embodiment, the method ranks the potential resolutions according to the frequency of the URLs in each potential resolution across the set of potential resolutions.

In an embodiment, the method presents the ranked set of potential resolutions to the user for evaluation. In this embodiment, the method provides an indication of the relative rankings as well as the relative separation of the potential resolutions in the ranked listing. In an embodiment, the method implements the top-ranked resolution, either automatically based upon a defined user setting enabling such an automatic implementation, or upon receiving input from the user acknowledging the resolution and approving implementation of the resolution.

In an embodiment, the method revises the predictive model(s) and the ontology after each use. In this embodiment, the method updates the ML models using the labeled combination of anomalous log lines, incident category and sub-category, and resolutions, from the most recent resolved incident. The method revises the ontology to include the incident solutions and category and subcategories associated with the most recently resolved incident.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise timeseries data set selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the log anomaly resolution recommendation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., log anomaly resolution recommendation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
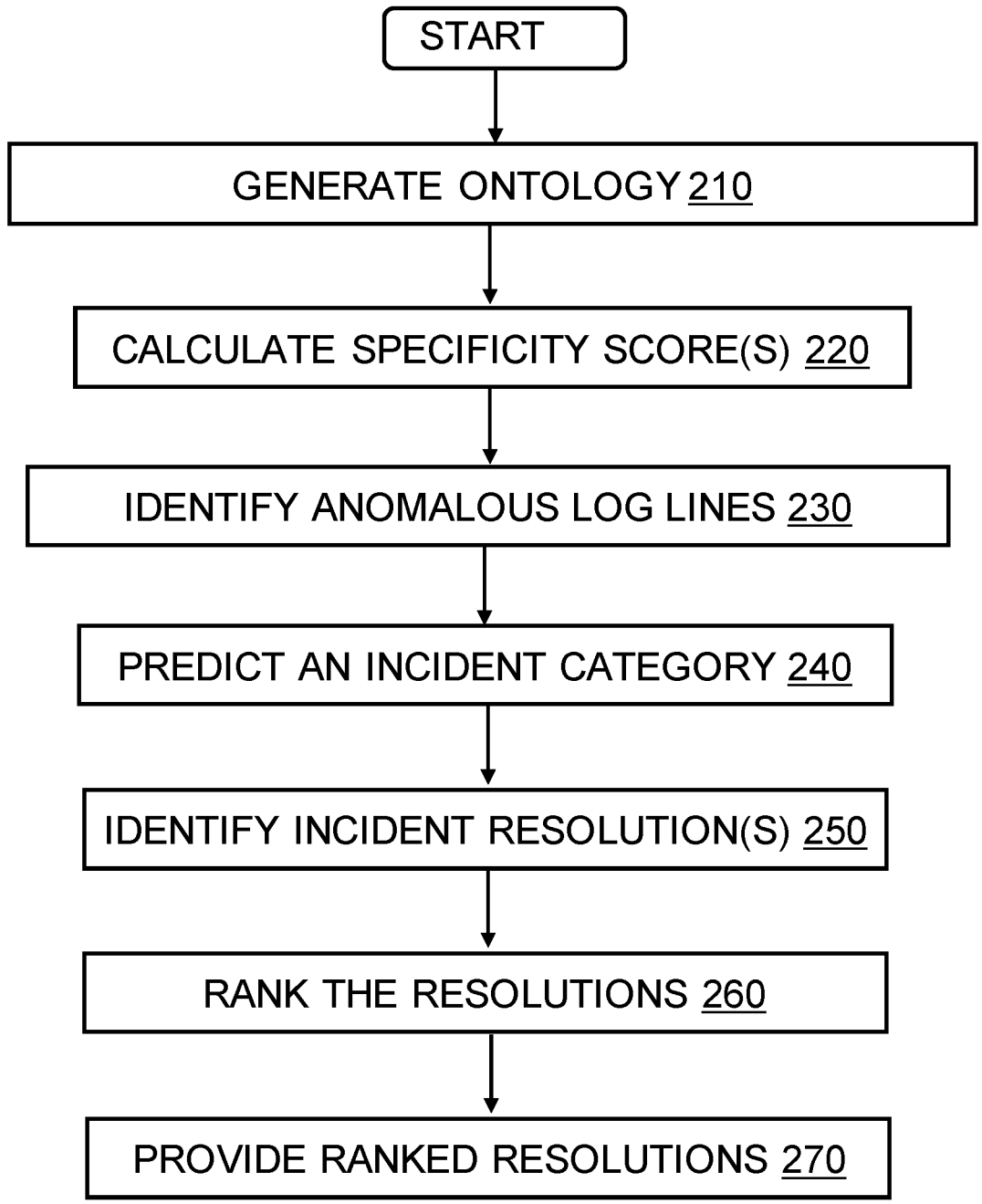
FIG. 2 provides a flowchart depicting an operational sequence, according to an embodiment of the invention.

FIG. 2 provides a flowchart 200, illustrating exemplary activities associated with the practice of the disclosure. After program start, at step 210, log anomaly resolution recommendation method evaluates historic system incident and log line data, compiling a knowledge base, or ontology, associating anomalous log line data with historic incidents and the resolutions applied to resolve those incidents. At step 220, the log anomaly resolution recommendation program determines a resolution specificity score of the resolutions applied to the respective incidents. At step 230, at run-time, the log anomaly resolution recommendation program 175 identifies anomalous log lines in live system log line data using a previously built anomalous log line identification model. At step 240, the method of the log anomaly resolution recommendation program 175 predicts an incident category and sub-category for the identified anomalous log lines. At step 250, the method maps the predicted category and sub-category to one or more potential log anomaly resolutions. At step 260, the method ranks the set of potential resolutions according to a relative scoring such as the relative URL specificity scores, the tuple specificity scores of the potential resolutions. At step 270, the method presents the recommended resolutions according to the ranking order. In an embodiment, the method further implements the top ranked resolution in response to either user input regarding the resolutions or according to preset user preferences and instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
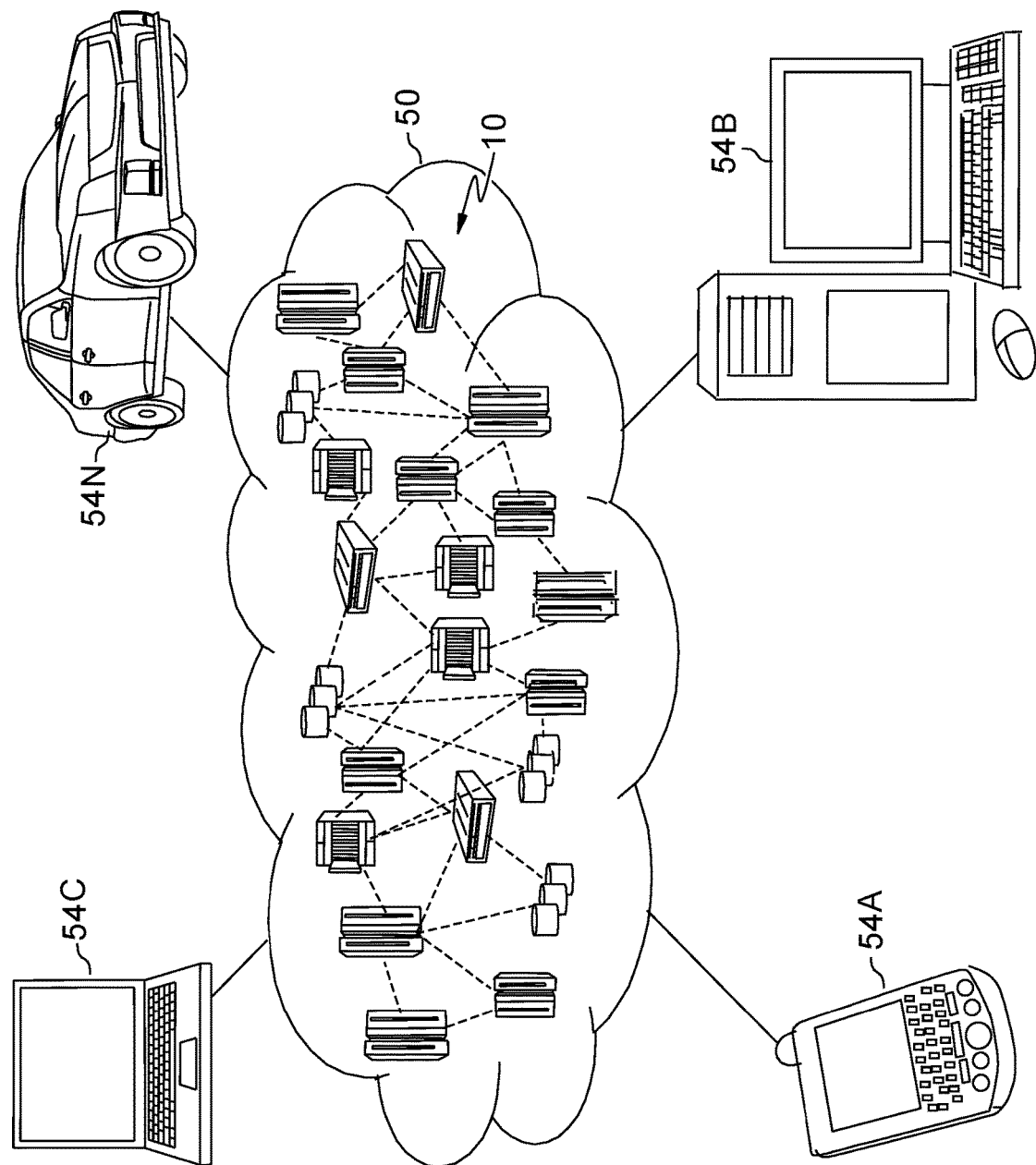
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
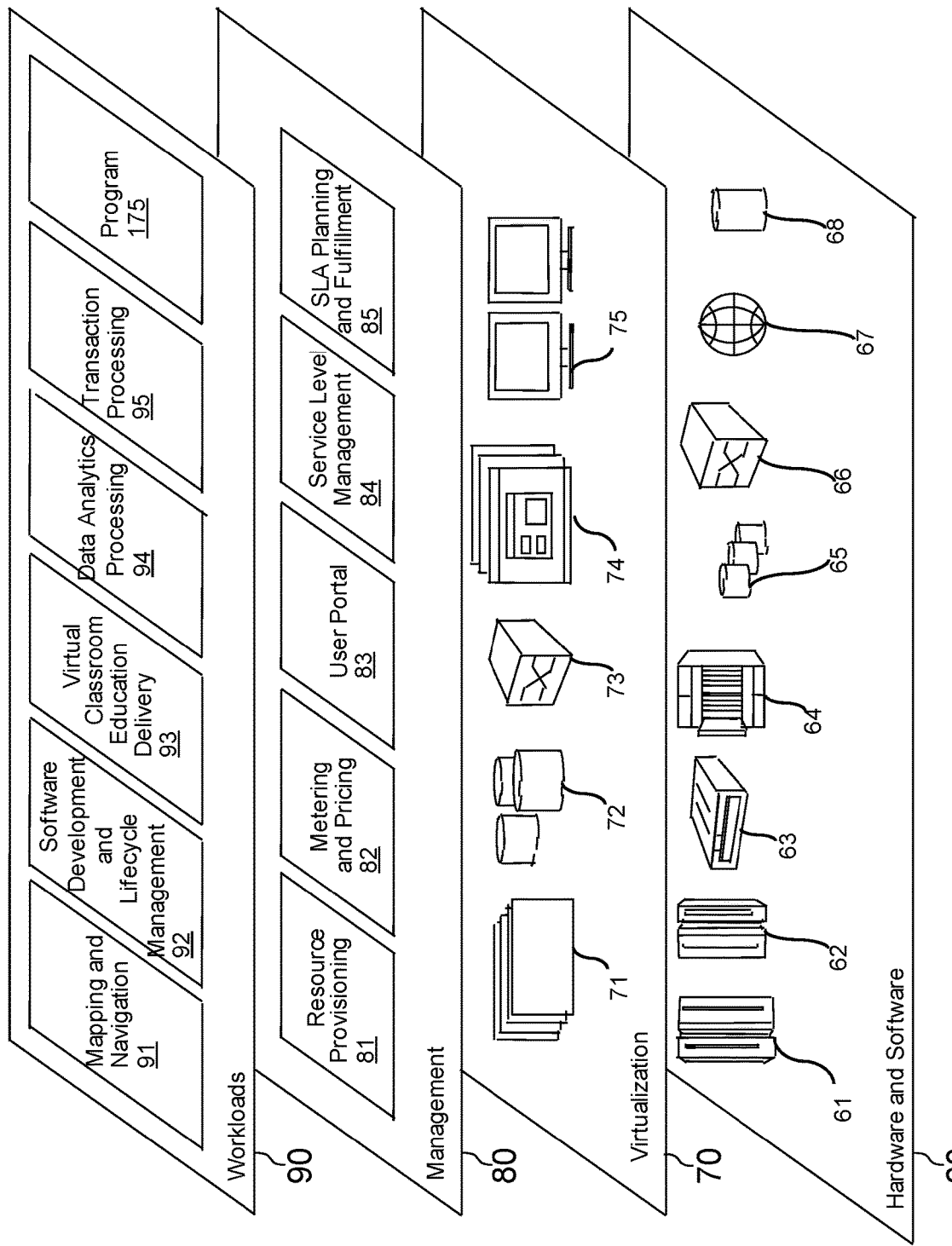
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log anomaly resolution recommendation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for identifying a log anomaly resolution, the method comprising:
    generating, by one or more computer processors, a knowledge base linking each of a plurality of historical incidents with historical anomalous log lines;
    calculating, by the one or more computer processors, a resolution specificity score for each knowledge base record;
    identifying, by the one or more computer processors, an out-of-control-band run-time anomalous log line using the knowledge base;
    predicting, by the one or more computer processors, a category for the run-time anomalous log line;
    identifying, by the one or more computer processors, resolutions according to the category;
    ranking, by the one or more computer processors, the resolutions according to the resolution specificity scores; and
    recommending, by the one or more computer processors, a resolution according to the ranking.

2. The computer implemented method according to claim 1, further comprising:
    predicting, by the one or more computer processors, a sub-category for the run-time anomalous log line according to the knowledge base; and
    identifying, by the one or more computer processors, resolutions according to the category and the sub-category.

3. The computer implemented method according to claim 1, further comprising:
    identifying, by the one or more computer processors, resolutions according to the category and a category prediction confidence.

4. The computer implemented method according to claim 1, further comprising revising, by the one or more computer processors, the knowledge base according to the run-time anomalous log lines.

5. The computer implemented method according to claim 1, further comprising ranking, by the one or more computer processors, the resolutions according to resolution feature frequency.

6. The computer implemented method according to claim 1, further comprising ranking, by the one or more computer processors, the resolutions according to resolution usages frequency.

7. The computer implemented method according to claim 1, further comprising:
    predicting, by the one or more computer processors, a sub-category for the run-time anomalous log line according to the knowledge base;
    identifying, by the one or more computer processors, message code from the run-time anomalous log line; and
    identifying, by the one or more computer processors, resolutions according to the message code, the category and the sub-category.

8. A computer program product for identifying log anomaly resolutions, the computer program product comprising one or more computer readable storage media and collectively stored program instructions on the one or more computer readable storage media the stored program instructions comprising:
- program instructions to generate a knowledge base linking each of a plurality of incidents with historical anomalous log lines;
- program instructions to calculate a resolution specificity score for each knowledge base record;
- program instructions to identify an out-of-control-band run-time anomalous log line using the knowledge base;
- program instructions to predict a category for the run-time anomalous log line;
- program instructions to identify resolutions according to the category;
- program instructions to rank the resolutions according to the resolution specificity scores; and
- program instructions to recommend a resolution according to the ranking.

9. The computer program product according to claim 8, the stored program instructions further comprising:
- program instructions to predict a sub-category for the run-time anomalous log line according to the knowledge base; and
- program instructions to identify resolutions according to the category and the sub-category.

10. The computer program product according to claim 8, the stored program instructions further comprising:
- program instructions to identify resolutions according to the category and a category prediction confidence.

11. The computer program product according to claim 8, the stored program instructions further comprising program instructions to revise the knowledge base according to the run-time anomalous log lines.

12. The computer program product according to claim 8, the stored program instructions further comprising program instructions to rank the resolutions according to resolution feature frequency.

13. The computer program product according to claim 8, the stored program instructions further comprising program instructions to rank the resolutions according to resolution usages frequency.

14. The computer program product according to claim 8, the stored program instructions further comprising:
- program instructions to predict a sub-category for the run-time anomalous log line according to the knowledge base;
- program instructions to identify message code from the run-time anomalous log line; and
- program instructions to identify resolutions according to the message code, the category and the sub-category.

15. A computer system for identifying log anomaly resolutions, the computer system comprising:
- one or more computer processors;
- one or more computer readable storage devices; and
- stored program instructions on the one or more computer readable storage devices for execution by the one or more computer processors, the stored program instructions comprising:
  - program instructions to generate a knowledge base linking each of a plurality of historical incidents with historical anomalous log lines;
  - program instructions to calculate a resolution specificity score for each knowledge base record;
  - program instructions to identify an out-of-control-band run-time anomalous log line using the knowledge base;
  - program instructions to predict a category for the run-time anomalous log line;
  - program instructions to identify resolutions according to the category;
  - program instructions to rank the resolutions according to the resolution specificity scores; and
  - program instructions to recommend a resolution according to the ranking.

16. The computer system according to claim 15, the stored program instructions further comprising:
- program instructions to predict a sub-category for the run-time anomalous log line according to the knowledge base; and
- program instructions to identify resolutions according to the category and the sub-category.

17. The computer system according to claim 15, the stored program instructions further comprising:
- program instructions to identify resolutions according to the category and a category prediction confidence.

18. The computer system according to claim 15, the stored program instructions further comprising program instructions to rank the resolutions according to resolution feature frequency.

19. The computer system according to claim 15, the stored program instructions further comprising program instructions to rank the resolutions according to resolution usages frequency.

20. The computer system according to claim 15, the stored program instructions further comprising:
- program instructions to predict a sub-category for the run-time anomalous log line according to the knowledge base;
- program instructions to identify message code from the run-time anomalous log line; and
- program instructions to identify resolutions according to the message code, the category and the sub-category.

* * * * *